United States Patent
Cho et al.

(10) Patent No.: US 7,269,679 B1
(45) Date of Patent: Sep. 11, 2007

(54) PCI-X ERROR CORRECTING CODE (ECC) PIN SHARING CONFIGURATION

(75) Inventors: Hanwoo Cho, Acton, MA (US); Richard W. Reeves, Westborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 225 days.

(21) Appl. No.: 11/151,317

(22) Filed: Jun. 14, 2005

(51) Int. Cl.
*G06F 13/36* (2006.01)

(52) U.S. Cl. .............. 710/311; 710/104; 710/316; 714/1

(58) Field of Classification Search ........... 710/104, 710/316; 714/5, 48, 753, 775; 713/503; 716/10
See application file for complete search history.

(56) References Cited

U.S. PATENT DOCUMENTS

| | | | |
|---|---|---|---|
| 5,974,573 A * | 10/1999 | Martin | 714/48 |
| 6,915,446 B2 * | 7/2005 | Riley | 714/5 |
| 7,043,656 B2 * | 5/2006 | Riley | 713/503 |
| 7,139,965 B2 * | 11/2006 | Shah et al. | 714/775 |
| 2004/0237018 A1 * | 11/2004 | Riley | 714/753 |
| 2005/0229132 A1 * | 10/2005 | Butt et al. | 716/10 |

OTHER PUBLICATIONS

"AMD-3181™ HyperTransport™ PCI-X® Tunnel Data Sheet", 24637 Rev. 3.02, Aug. 10, 2004, pp. 1-87.

* cited by examiner

*Primary Examiner*—Christopher E. Lee
(74) *Attorney, Agent, or Firm*—Manelli Denison & Selter PLLC; Leon R. Turkevich

(57) ABSTRACT

A method is provided for utilizing four error correcting code (ECC) pin connections of a PCI/PCI-X bus for one of Grant (GNT) and Request (REQ) pin connections. The method determines a mode of the PCI bus to be PCI-X Mode 1, PCI-X Mode 2, or PCI. If the determined mode is PCI-X Mode 2, the four ECC pin connections are used as ECC pin connections, and if the determined mode is PCI or PCI-X Mode 1, each of the four ECC pin connections is used as a GNT pin connection or a REQ pin connection.

15 Claims, 3 Drawing Sheets

| Pin Name | PCI-X MODE2 | PCI-X MODE1 | PCI |
|---|---|---|---|
| ECC0 | ECC0 | REQ | REQ |
| ECC1 | ECC1 | GNT | GNT |
| ECC2 | ECC2 | REQ | REQ |
| ECC3 | ECCC3 | GNT | GNT |

PCI-X ERROR CORRECTING CODE (ECC) PIN SHARING CONFIGURATION

BACKGROUND OF THE INVENTION

1. Field of the Invention

The present invention relates to Peripheral Component Interconnect (PCI) interfaces and, more particularly, to a PCI host bridge that uses PCI-X Mode 2 ECC pin connections as Grant/Request pin connections when a device is not operating in PCI-X Mode 2.

2. Background Art

Peripheral Component Interconnect (PCI) interfaces have been used to provide high-speed connectivity between devices in a multi-device system, for example, a processor based system such as a personal computer.

FIG. 1 is a diagram illustrating a conventional implementation of a PCI bus system architecture 100. The system 100 includes a processor 102 coupled to a memory controller 104 via a local bus 106'. The processor 102 and the memory controller 104 are coupled to a PCI local bus 106 (labeled PCI Local Bus #0) via a host bridge 108.

The host bridge 108 provides a low latency path through which the processor 102 may directly access PCI devices 110, for example a network interface card 110a providing access to a local area network 112, a disc drive (SCSI) controller 110b providing access to disk drives 114, an audio card 110c, a motion picture card 110d, or a graphics card 110e configured for driving a monitor 116. The host bridge 108 also provides a high bandwidth path allowing PCI masters on the PCI bus 106 direct access to the system memory 118 via the memory controller 104. A cache memory 120 is independent of the system memory 118 for use by the processor 102.

The term "host bridge" refers to the bridge device 108 that provides access to the system memory 118 for the devices 110 connected to the PCI bus 106. A PCI-to-PCI bridge 122 also may be used to connect a second PCI bus 124 to the PCI bus 106, the second PCI bus 124 configured for connecting other I/O devices 126.

Newer PCI bus protocols are being published, including PCI-X Mode 2, that provide enhanced PCI functionality. These newer PCI bus protocols include the PCI Local Bus Specification, Rev 2.3, the PCI-X Protocol Addendum to the PCI Local Bus Specification, Rev. 2.0a, and the PCI-to-PCI Bridge Architecture Specification, Rev 1.2.

The newer PCI host bridge devices may utilize HyperTransport™ technology, which specifies a data rate of 1.6 GHz between each differential signal pair. Hence, the newer PCI bus devices need to be implemented using newer semiconductor fabrication process technology to optimize the higher speed requirements of HyperTransport™ technology.

In normal PCI mode, up to five devices can be supported by the PCI host bridge device. Each device must have two pins, one pin for a Grant (GNT) signal and another pin for a Request (REQ) signal to use the PCI bus. Thus a total of ten pin connections are needed on the PCI host bridge device.

The PCI-X Protocol Addendum Rev 2.0a defines four error correcting code (ECC) signals for use in PCI-X Mode 2. Thus, four pin connections must be added to PCI/PCI-X host bridge device. Only one external device can be supported with ECC in PCI-X Mode 2.

SUMMARY OF THE INVENTION

There is a need to reduce the number of pins provided on a PCI host bridge by using the ECC pin connections of PCI-X Mode 2 as GNT or REQ pin connections in PCI or PCI-X Mode 1.

An object of the present invention is to fulfill the need referred to above. In accordance with the principles of the present invention, this objective is achieved by providing a method for utilizing four error correcting code (ECC) pins of a PCI/PCI-X bus for one of the Grant (GNT) or Request (REQ) pin connections. The method determines a mode of the PCI/PCI-X bus to be PCI-X Mode 1, PCI-X Mode 2, or PCI. If the determined mode is PCI-X Mode 2, the four ECC pins are used as ECC pin inputs, and if the determined mode is PCI or PCI-X Mode 1, each of the four ECC pin inputs is used as a GNT pin connection or a REQ pin connection.

In accordance with another aspect of the invention, a PCI device includes four error correcting code (ECC) pin connections. A circuit is associated with the pin connections and the circuit provides first and second pairs of output signals. A first logic receives the first pair of output signals. The first logic is constructed and arranged to perform ECC functions. A second logic receives the second pair of output signals. The second logic is constructed and arranged to perform Grant (GNT) and Request (REQ) functions.

Thus, since ECC pin connections can be used for GNT and REQ pin connections in PCI and PCI-X Mode 1, the number of pin connections can be reduced.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment is an arrangement for using ECC pin connections as GNT/REQ pin connections when a PCI bus is in a PCI or PCI-X Mode 1 and will be described in detail following an overview of the architecture of the HyperTransport™ tunnel/PCI-X bridge.

Architecture Overview

Figure 1:
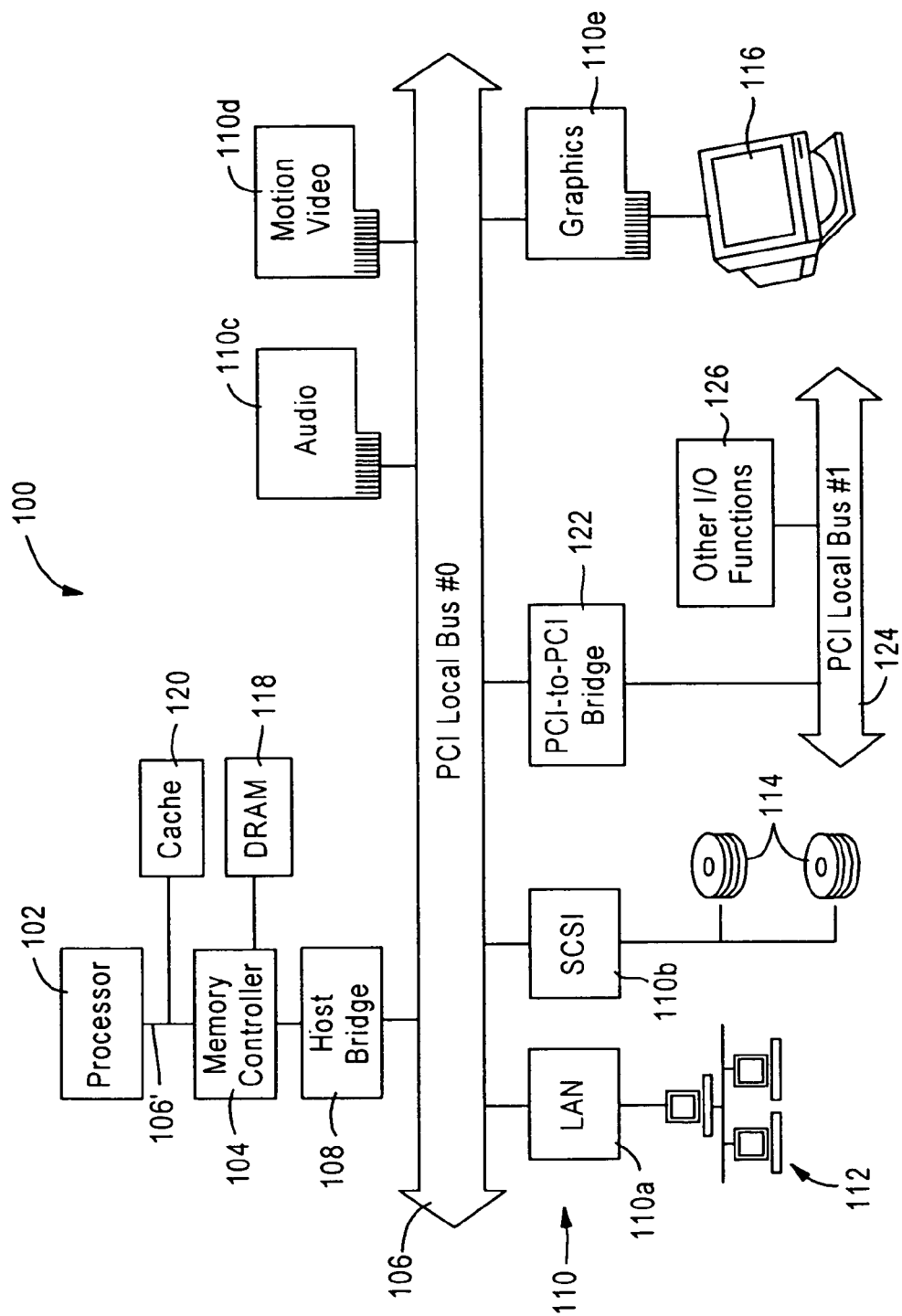
FIG. 1 is a block diagram of a conventional (PRIOR ART) implementation of a PCI based system.
Figure 2:
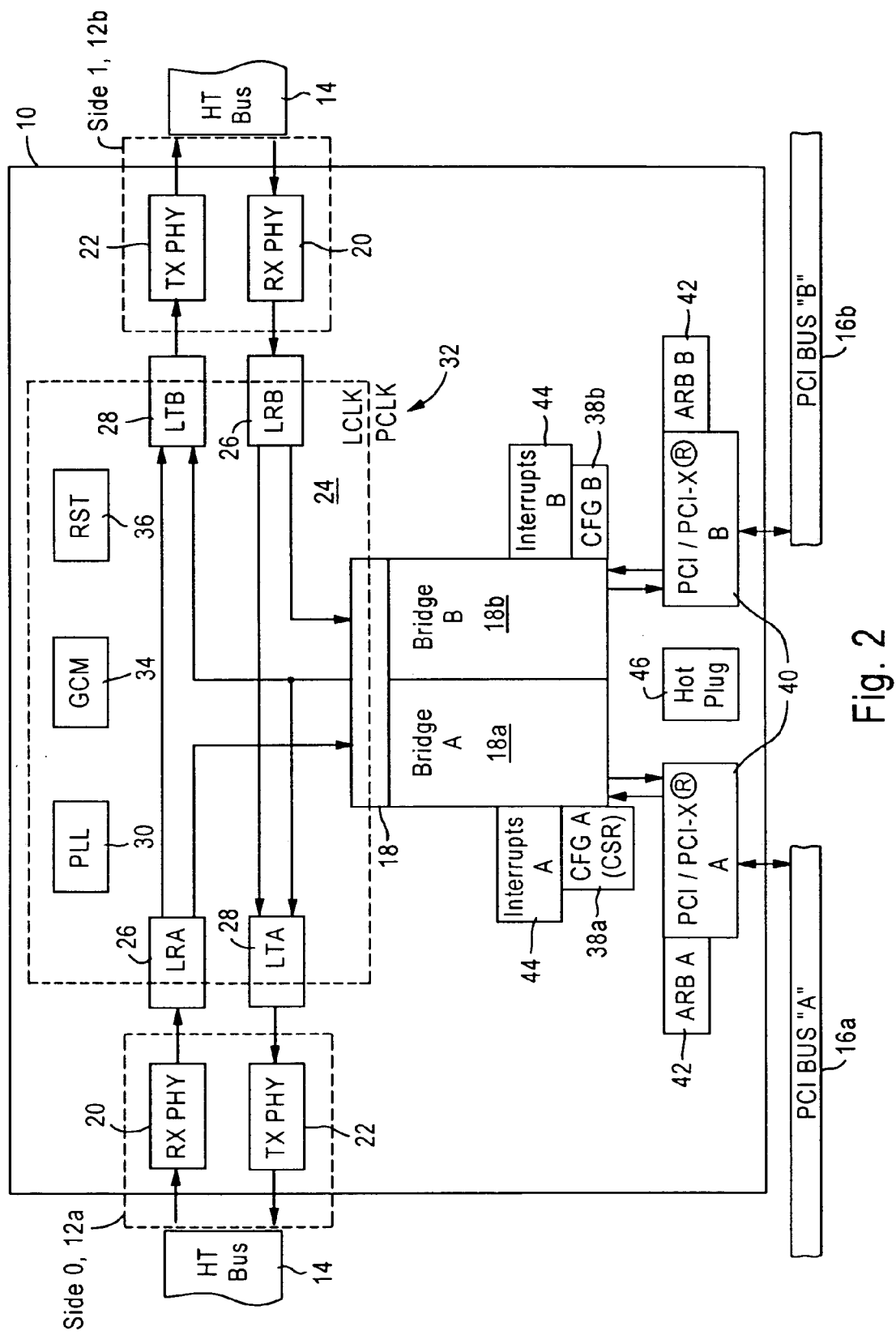
FIG. 2 is a block diagram of a PCI host bridge device according to an embodiment of the present invention.

FIG. 2 is a diagram illustrating the transport tunnel-to-PCI host bridge device 10, according to an embodiment of the present invention. The transport tunnel-to-PCI host bridge device 10, preferably implemented as an integrated circuit on a single chip, is configured for operating as a HyperTransport™ (HT) tunnel device according to the HyperTransport™ IO Link Specification, Rev. 2.0, including errata up to specification Rev. 1.05c.

The transport tunnel-to-PCI host bridge device 10 includes two HT interfaces 12*a* and 12*b* labeled "Side 0" and "Side 1", respectively. HT packets received by a given interface (e.g., 12*a*) from an HT bus 14 can be passed through the device 10 to the other interface (e.g., 12*b*) (i.e., tunneled), enabling multiple HT tunnel devices to be connected serially (e.g., a daisy-chain arrangement) to form an HT chain on the bus 14 for transfer of HT packets.

The following nomenclature may assist in describing connections in serially connected HT tunnel devices. The HT interface (e.g., 12*a*) that is connected to (or toward) a HyperTransport™ host device (e.g., a host memory controller) is referred to as the "upstream" interface, and the other HT interface (e.g., 12*b*) is referred to as the "downstream" interface: if the upstream interface (e.g., 12*a*) is directly connected to the HyperTransport™ host device via the corresponding connected HT tunnel 14, then that tunnel connecting the upstream interface to the HyperTransport™ host device is referred to as the "upstream link"; if the upstream interface (e.g., 12*a*) is connected to a second HT device via an HT tunnel, where the second HT device provides a connection to (or toward) the HyperTransport™ host device, then that HT tunnel connecting the upstream interface and the second HT device is referred to as the "upstream tunnel". Note that the downstream interface may or may not be connected to another HT device or chain of devices.

The transport tunnel-to-PCI host bridge device 10 also provides bridging operations between the HT bus 14 and PCI buses 16*a* and/or 16*b*. In particular, the transport tunnel-to-PCI host bridge device 10 contains two independent HT-to-PCI-X bridges 18*a* and 18*b* in accordance with the HyperTransport™ Link Specification, Rev. 2.0, the PCI Local Bus Specification, Rev 2.3, the PCI-X Protocol Addendum to the PCI Local Bus Specification, Rev. 2.0a, and the PCI-to-PCI Bridge Architecture Specification, Rev 1.2. The transport tunnel-to-PCI host bridge device 10 includes configurable registers (38*a*, 38*b*) that identify the address ranges utilized by each of the PCI bus 16*a*, the PCI bus 16*b*, and the HT bus 14.

Also note that the device 10 may identify a destination for a received HT packet based on a device identifier and bus identifier specified in the HT packet; alternately the device 10 may be configured to identify a destination bridge (e.g., 18*a*, 18*b*) based on a corresponding unit identifier (e.g., 181, 182) according to HyperTransport™ protocol. In addition, the transport tunnel-to-PCI host bridge device 10 includes configuration (CFG) registers 38*a*, 38*b*: the configuration register 38*a* includes command and status registers (CSRs) within prescribed address spaces used by the transport tunnel-to-PCI host bridge device 10 for internal configuration, in accordance with the above-described PCI and HyperTransport™ specifications. Hence, the transport tunnel-to-PCI host bridge device 10 can store configuration information to an addressable CSR based on identifying an HT packet specifying a device identifier for the device 10.

Hence, the transport tunnel-to-PCI host bridge device 10 can either tunnel HT packets received from the HT bus 14 by passing the packets from one interface (e.g., 12*a*) to the other interface (e.g., 12*b*), or the transport tunnel-to-PCI host bridge device 10 can pass the HT packets to one of the PCI buses 16*a* or 16*b* via the corresponding bridge 18*a* or 18*b*. Also note that the transport tunnel-to-PCI host bridge device 10 can process and respond to a received HT packet that is destined for the transport tunnel-to-PCI host bridge device 10 (e.g., for storage of configuration data).

The bridges 18*a* and 18*b* of the transport tunnel-to-PCI host bridge device 10 also forward onto the HT bus 14 any data having been received from the respective PCI buses 16*a* or 16*b* that specify a destination address within the prescribed address range specified within the CSRs for the HT bus 14.

Each of the HT interfaces 12*a* and 12*b* includes a receive physical layer transceiver (RX PHY) 20 and a transmit physical layer transceiver (TX PHY) 22. Each of the PHYs 20 and 22 include synchronization First-in-First-out (FIFO) registers for buffering packets according to a prescribed HT clock domain, and compensation circuitry to ensure electrical compliance with the HyperTransport™ specification. In particular, the RX PHY receives a packet and a clock associated with the packet according to the HT clock domain on the bus 14; the FIFO registers in the PHYs 20 and 22 are used to transition between the HT clock domain and a local clock (LCLK) domain 24.

The device 10 includes a local clock (LCLK) domain 24 that relies on a clock that is independent of any variations in clocks driven by the HT bus 14. The device 10 includes, within the local clock domain 24, receive logic 26 and transmit logic 28 for each of the HT interfaces 12 and 12*b*. The device also includes a phase locked loop (PLL) circuit 30 configured for generating the local clock (LCLK) and a phase-controlled clock (PCLK) 32, and maintaining synchronization of those clocks as needed.

The receive logic 26 is configured for determining whether a received HT packet from the HT bus 14 should be forwarded to the corresponding transmit logic 28 for tunneling of the HT packet, whether the received HT packet should be forwarded to the bridge 18 for internal configuration of the device 10, or forwarded to the bridge 18 for transfer of the received HT packet onto a determined one of the PCI buses 16*a* or 16*b*.

The device 10 also includes within the local clock domain a link interface cycle manager (GCM) 34. The GCM 34 is configured for arbitrating the order of transactions that are to occur within the local clock domain 24. For example, the GCM 34 may arbitrate between transactions that are to be output by the transmit logic (LTA) 28. The reset logic (RST) 36 is configured for managing reset and device initialization operations, including implementing test and diagnostic modes.

The HT-to-PCI bridge 18 is configured for transferring HT packets, forwarded from the HT bus 14 by one of the receive logic blocks (e.g., LRA or LRB) 26, to one of the PCI buses 16*a* or 16*b*. In particular, the receive logic block 26 having received the HT packet will specify to the bridge 18 the PCI bus (e.g., 16*a*) on which the HT packet is to be output. The HT-to-PCI bridge 18 also is configured for transferring packets from one of the PCI buses 16*a* or 16*b* to one of the transmit logic blocks (e.g., LTA or LTB) 28 for output onto the HT bus 14. The bridge 18 (e.g., the bridge 18*a*) identifies the destination address of the HT packet as falling within the address range of either the PCI bus (e.g., 16*a*) or the configuration space of the configuration register (e.g., 38*a*), and forwards the packet accordingly.

The device 10 also includes, for each PCI bus (e.g., 16*a*, 16*b*), a bridge 18*a* and 18*b*, the configuration registers 38*a* and 38*b*, a PCI interface module 40, a PCI arbitration module 42, and an interrupt controller 44. The device 10 also includes a hot plug module 46. The configuration registers 38a and 38b include registers, addressable via the HT bus 14, for configuration of the respective components associated with bus operations for the respective PCI buses 16a and 16b. Each PCI interface module 40 is configured for transmitting and receiving PCI data bursts according to the above-identified PCI specifications. Each PCI arbitration module 42 is configured for managing PCI bus arbitrations for the corresponding attached PCI bus (e.g., 16a or 16b), including identifying a bus master for PCI bus transactions. Each interrupt controller 44 is configured for servicing interrupts detected on the corresponding PCI bus (e.g., 16a or 16b), as well as interrupts generated according to prescribed I/O Advanced Programmable Interrupt Controller (IOAPIC) specifications. Hence, various interrupt methods may be implemented in the interrupt controllers 44.

The hot plug module 46 is configured for managing hot plug operations based on prescribed configuration registers in the registers 38a and/or 38b, where a selected PCI slot or device can be powered down while the device 10, as well as other PCI devices on the PCI bus, remain in a powered state. For example, the hot plug module 46 may include logic that is compliant with the Standard Hot Plug Circuitry (SHPC) specified in the above-described PCI specifications; alternative implementations also may be included in the hot plug module 46, for example logic configured for interfacing with commercially-available power controllers, including the TPS2340A or the TPS2342 power controllers commercially available from Texas Instruments, Inc.

Sing ECC Pin Input for GNT/REO Pin Input in PCI or PCI-X Mode 1

Figures 3, 4:
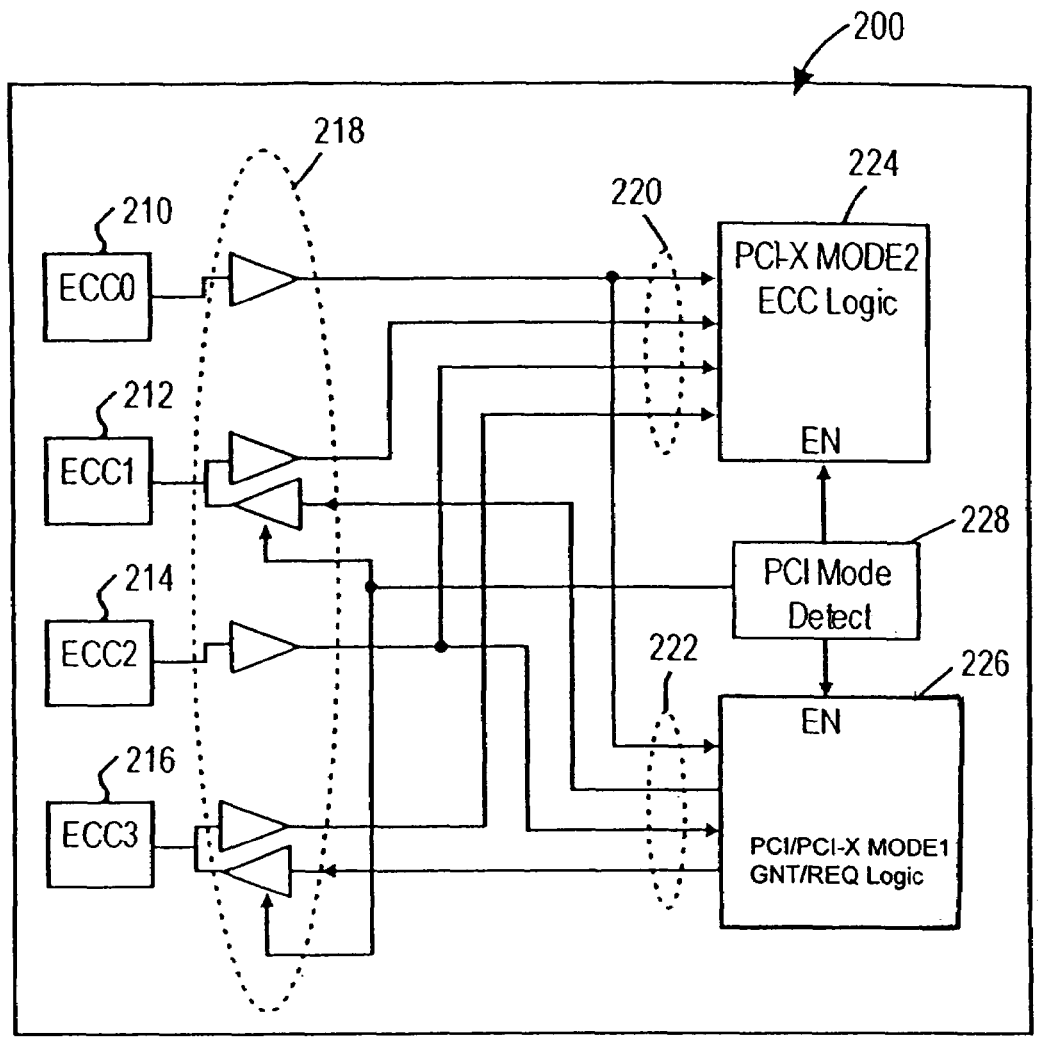
FIG. 3 is a block diagram of a PCI device that selectively provides signals to an ECC logic or a GNT/REQ logic in accordance with the invention.
FIG. 4 is a table showing the ECC pin signals for three different modes, PCI-X Mode 1, PCI-X Mode 2 and PCI.

FIG. 3 is a diagram illustrating a PCI device 200, according to an embodiment of the invention that is preferably implemented as an integrated circuit on a single chip in that may be included in the PCI interface module 40 (FIG. 2).

The PCI-X Protocol Addendum Rev 2.0a defines four error correcting code (ECC) signals such as, $ECC_2$, $ECC_3$, $ECC_4$, and $ECC_6$ for use in PCI-X Mode 2. Thus, four pins must be added to PCI host bridge device 10. The four ECC signals are used only in PCI-X Mode 2 and are not required for use in PCI or PCI-X Mode 1.

The device 200 includes a pad or pin connection 210, 212, 214 and 216 associated with a respective error code signal $ECC_2$, $ECC_3$, $ECC_4$, and $ECC_6$, and a circuit 218 that has two pairs of output signals, 220 and 222. The output signal 220 includes the output signals from each pin input 210, 212, 214 and 216 and this output signal 220 is received by an ECC logic 224 for performing conventional ECC functions. The output signal 222 includes the output signals from pin connections 210 and 214 and this output signal 222 is received by a GNT/REQ logic 226 for performing GNT or REQ functions.

When the PCI/PCI-X Bus is in the PCI-X Mode 2, only one device needs to be supported with ECC by the PCI host bridge device 10 and thus, only two pin connections are required for the GNT and REQ signals. However, in normal PCI mode, up to five devices can be supported by the PCI host bridge device 10 (FIG. 2). Each supported device must have two pins, one pin for a Grant (GNT) signal and another pin for a Request (REQ) signal to use the PCI/PCI-X bus. Thus, a total of ten pin connections are required. In accordance with the embodiment, four of the pin connections that are used for ECC in PCI-X Mode 2, can be used as GNT or REQ pin connections in PCI and PCI-X Mode 1. Thus, the number of pin connections on the PCI host bridge device 10 is reduced.

A mode detection circuit 228 determines the mode of the PCI bus and signals the appropriate logic 224 or 226 of the PCI/PCI-X bus mode. Thus, if the PCI/PCI-X bus is in PCI-X Mode 2, logic 224 is enabled and the ECC pin connections, 210, 212, 214, and 216 are utilized for their intended ECC purpose. If the PCI/PCI-X bus is in PCI Mode 1 or PCI, logic 226 is enabled for GNT and REQ logic functions. Since GNT is an output signal, as shown in FIG. 3, output signals from logic 226 are provided at $ECC_3$ and $ECC_6$.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of utilizing four error correcting code (ECC) pin connections associated with a PCI/PCI-X bus for one of Grant (GNT) and Request (REQ) pin connections, the method including:
   determining a mode of a PCI/PCI-X bus to be one of PCI-X Mode 1, PCI-X Mode 2 and PCI,
   if the determined mode is PCI-X Mode 2, using the four ECC pin connections as ECC pin connections, and
   if the determined mode is one of PCI and PCI-X Mode 1, using each of the four ECC pin connections as one of a GNT pin connection and a REQ pin connection.

2. The method of claim 1, wherein, if the determined mode is PCI-X Mode 2, the method includes receiving four ECC signals, associated with the four ECC pin connections, at a first logic, the first logic being constructed and arranged to perform ECC logic functions.

3. The method of claim 2, wherein, if the determined mode is one of PCI and PCI-X Mode 1, the method includes receiving ECC signals, associated with certain of the ECC pin connections, at a second logic, the second logic being constructed and arranged to perform GNT and REQ logic functions.

4. A PCI device comprising:
   four error correcting code (ECC) pin connections,
   a circuit associated with the pin connections, the circuit providing first and second pairs of output signals,
   a first logic, receiving the first pair of output signals, constructed and arranged to perform ECC functions, and
   a second logic, receiving the second pair of output signals, constructed and arranged to perform Grant (GNT) and Request (REQ) functions.

5. The device of claim 4, further including a PCI mode detection circuit constructed and arranged to determine a mode of a PCI bus and to signal one of the first and second logics based on the determined mode.

6. The device of claim 5, wherein the mode detection circuit is constructed and arranged to determine the PCI bus mode to be one of PCI-X Mode 2, PCI-X Mode 1, and PCI.

7. The device of claim 6, wherein the mode detection circuit is constructed and arranged to signal the first logic if the bus mode is PCI-X Mode 2.

8. The device of claim 6, wherein the mode detection circuit is constructed and arranged to signal the second logic if the bus mode is one of PCI-X Mode 1 and PCI.

9. The device of claim 4, wherein the second logic provides output signals to certain of the ECC pin connections for GNT functions.

10. A PCI device comprising:

four error correcting code (ECC) pin connections, means, associated with the pin connections, for providing first and second pairs of output signals, first means, receiving the first pair of output signals, for performing ECC logic functions, and second means, receiving the second pair of output signals, for performing Grant (GNT) and Request (REQ) logic functions.

11. The device of claim 10, further including means for determining a mode of a PCI bus and for signaling one of the first and second means based on the determined mode.

12. The device of claim 11, wherein the mode determining means determines the PCI bus mode to be one of PCI-X Mode 2, PCI-X Mode 1, and PCI.

13. The device of claim 12, wherein the mode determining means signals the first means if the bus mode is PCI-X Mode 2.

14. The device of claim 12, wherein the mode determining means signals the second means if the bus mode is one of PCI-X Mode 1 and PCI.

15. The device of claim 10, wherein the second means provides output signals to certain of the ECC pin connections for GNT functions.

* * * * *